(12) United States Patent
Istre et al.

(10) Patent No.: US 7,503,961 B2
(45) Date of Patent: Mar. 17, 2009

(54) BOILER FEED WATER DEAERATOR METHOD AND APPARATUS

(75) Inventors: Ken M. Istre, Sulphur, LA (US); David C. Payne, Orange, TX (US)

(73) Assignee: Westlake Chemical Corporation, Houston, TX (US)

( * ) Notice: Subject to any disclaimer, the term of this patent is extended or adjusted under 35 U.S.C. 154(b) by 604 days.

(21) Appl. No.: 11/295,410

(22) Filed: Dec. 6, 2005

(65) Prior Publication Data

US 2006/0118064 A1   Jun. 8, 2006

Related U.S. Application Data

(60) Provisional application No. 60/633,918, filed on Dec. 7, 2004.

(51) Int. Cl.
*B01D 19/00* (2006.01)
(52) U.S. Cl. .............................. 95/265; 95/244; 95/264; 96/202; 96/203
(58) Field of Classification Search ............ 95/244, 95/265, 245, 251, 264; 96/202, 218, 203
See application file for complete search history.

(56) References Cited

U.S. PATENT DOCUMENTS

| | | | |
|---|---|---|---|
| 1,914,166 A | * | 6/1933 | Rohlin ..................... 95/19 |
| 2,078,288 A | * | 4/1937 | Sherman .................. 95/244 |
| 3,705,477 A | | 12/1972 | Longo et al. |
| 3,815,330 A | | 6/1974 | Lawley |
| 3,977,972 A | | 8/1976 | Bloch et al. |
| 4,017,276 A | | 4/1977 | Bloem |
| 4,136,747 A | | 1/1979 | Mallory et al. |
| 4,259,360 A | | 3/1981 | Venetucci et al. |
| 4,365,978 A | | 12/1982 | Scott |
| 4,547,293 A | | 10/1985 | King et al. |

(Continued)

FOREIGN PATENT DOCUMENTS

EP   0 417 342   3/1991

(Continued)

OTHER PUBLICATIONS

PCT/US2005/044213—PCT International Search Report.

(Continued)

*Primary Examiner*—Duane S Smith
*Assistant Examiner*—Douglas J Theisen
(74) *Attorney, Agent, or Firm*—Greenberg Traurig LLP

(57) ABSTRACT

A nitrogen sweep stream for use in a deaerator during deaerator operations to disperse and remove oxygen and carbon dioxide from boiler feed water prior to being fed to a boiler. The nitrogen sweep stream substantially reduces the amount of oxygen and carbon dioxide in the water supply system. The water supply system can be sent to a deaerator stripper or can be heated using a heat exchanger. A heat water supply stream can also be sent directly to the deaerator water tank. The nitrogen sweep stream reduces the amount of oxygen contained with the boiler feed water stream to less than 7 ppb and reduces the amount of carbon dioxide to nondetectable levels. The nitrogen sweep may be provided to an existing deaerator, not having been previously provided with a nitrogen sweep, while the deaerator is running without shutting down the deaerator.

14 Claims, 1 Drawing Sheet

U.S. PATENT DOCUMENTS

| | | |
|---|---|---|
| 4,612,021 A | 9/1986 | Bland et al. |
| 4,613,347 A | 9/1986 | Ranchet et al. |
| 4,759,315 A * | 7/1988 | Chiou et al. .................. 122/442 |
| 4,927,433 A * | 5/1990 | Wieland et al. .................. 95/12 |
| 5,050,540 A * | 9/1991 | Lindberg .................... 122/4 R |
| 5,112,357 A | 5/1992 | Bjerklund et al. |
| 5,180,403 A | 1/1993 | Kogure |
| 5,201,366 A * | 4/1993 | Blangetti et al. ............. 165/112 |
| 5,203,286 A * | 4/1993 | Youssef ...................... 122/488 |
| 5,273,572 A | 12/1993 | Baker et al. |
| 5,389,126 A | 2/1995 | Baker et al. |
| 5,766,321 A | 6/1998 | Ishihara et al. |
| 5,772,731 A | 6/1998 | Harrison |
| 6,174,506 B1 | 1/2001 | Chakravarti et al. |
| 6,193,786 B1 | 2/2001 | Henderson |
| 2004/0000234 A1 * | 1/2004 | Preusse et al. ................. 95/263 |

FOREIGN PATENT DOCUMENTS

| | | |
|---|---|---|
| FR | 2310789 | 12/1976 |
| FR | 2565276 | 12/1985 |
| GB | 2202167 | 9/1988 |
| GB | 2223960 | 4/1990 |
| GB | 2 127 711 | 4/1994 |
| JP | 358133885 A | 8/1983 |
| JP | 360028811 A | 2/1985 |
| JP | 402090984 A | 3/1990 |
| JP | 406106004 A | 4/1994 |

OTHER PUBLICATIONS

PCT/US2005/044213—PCT Written Opinion of the International Searching Authority.

* cited by examiner

US 7,503,961 B2

BOILER FEED WATER DEAERATOR METHOD AND APPARATUS

RELATED APPLICATION

This application claims the benefit and priority of U.S. Provisional Patent Application Ser. No. 60/633,918, filed Dec. 7, 2004.

TECHNICAL FIELD

The present invention relates to steam systems for petrochemical facilities. More specifically, the present invention relates to removal of oxygen from boiler feed water streams by utilizing a deaerator system.

BACKGROUND OF THE INVENTION

Deaerators are widely used in the petrochemical, refining, and power generation industries. A deaerator is a mechanical piece of equipment that is used to heat boiler feed water and to remove oxygen and carbon dioxide from boiler feed water, prior to the water being fed to the boiler. Oxygen and carbon dioxide contained within boiler feed water cause significant corrosion in the steam system, namely the boiler tubes, steam lines, condensate lines, and heat transfer equipment. Additionally, if the boiler feed water has oxygen in it, the oxygen may cause corrosion to surface condensers which may release copper. The released copper in the steam system may create a major problem when it is necessary to make any repair welds to the steam system. Use of a deaerator substantially decreases the amount of corrosion that develops in the steam system by the removal of oxygen and carbon dioxide.

Deaerators use a mechanical stripping mechanism to release the oxygen and carbon dioxide contained within the boiler feed water. Several types of stripping mechanisms are commercially available for deaerators. In large plants that have high steam capacity requirements, a tray deaerator is typically used. In smaller plants that have a lower steam requirement, a packed column or spray type deaerator is used. Although deaerators are able to remove a large portion of the oxygen and carbon dioxide, many times the stripping capabilities of the deaerator are inadequate to remove enough oxygen and carbon dioxide to sufficiently minimize corrosion within the steam system.

Because deaerators are only able to remove a portion of the oxygen from boiler feed water, many petrochemical facilities use chemicals that are commonly referred to as "oxygen scavengers" to further reduce the amount of oxygen in the boiler feed water. Example oxygen scavengers include sulphite, tannin, and caustic based chemicals. Oxygen scavengers are very expensive and add considerable operating costs to the steam system.

Although chemicals, such as oxygen scavengers, are available to remove oxygen from boiler feed water, most plants still have the need for a deaerator. The deaerator has additional advantages to using it, in addition to reducing components that cause corrosion in the steam system. The deaerator can also provide an effective means for recovery of heat from the boiler exhaust or flash steam. The deaerator can also recover condensate from the steam system to reduce amount of make up water that is required to be fed to the boiler.

A need exists for an economical process that is capable of removing oxygen from boiler feed water to supplement or replace the use of a deaerator. It would be advantageous for the process to also remove other gases, such as carbon dioxide, that also cause corrosion within the steam system. It would also be advantageous if the process could be used with new deaerator systems and existing ones, and in particular existing, operating systems.

SUMMARY OF THE INVENTION

In view of the foregoing, the present invention advantageously provides a method of removing oxygen from a boiler feed water stream. The method includes the step of supplying a water supply stream to a deaerator stripper where the water supply stream is heated and at least a portion of oxygen and at least a portion of carbon dioxide contained therein are removed. The water supply stream descends down the deaerator stripper to a deaerator tank. Alternatively, the water supply stream can be heated by utilizing a heat exchanger or the like and supplied to the deaerator tank without the use of deaerator stripper.

A nitrogen sweep stream is then supplied to the deaerator water tank during deaerator operations. The nitrogen sweep stream thereby diffuses any remaining oxygen in the water supply stream resulting in a substantial portion of the remaining oxygen being removed from the water supply stream to produce a reduced oxygen containing water supply stream. The nitrogen sweep stream also substantially removes any remaining carbon dioxide contained within the water supply stream. The reduced oxygen containing water supply stream is then supplied to a boiler as a feed water stream having substantially reduced oxygen and carbon dioxide contained therein. The nitrogen sweep stream is maintained during deaerator operations to remove oxygen and carbon dioxide from the water supply stream.

In addition to the method embodiments, a deaerator apparatus is also advantageously provided as an embodiment of the present invention.

While the invention will be described in connection with the preferred embodiment, it will be understood that it is not intended to limit the invention to that embodiment. On the contrary, it is intended to cover all alternatives, modifications, and equivalents, as may be included in the spirit and scope of the invention as defined by the appended claims.

DETAILED DESCRIPTION OF THE INVENTION

Figure 1:
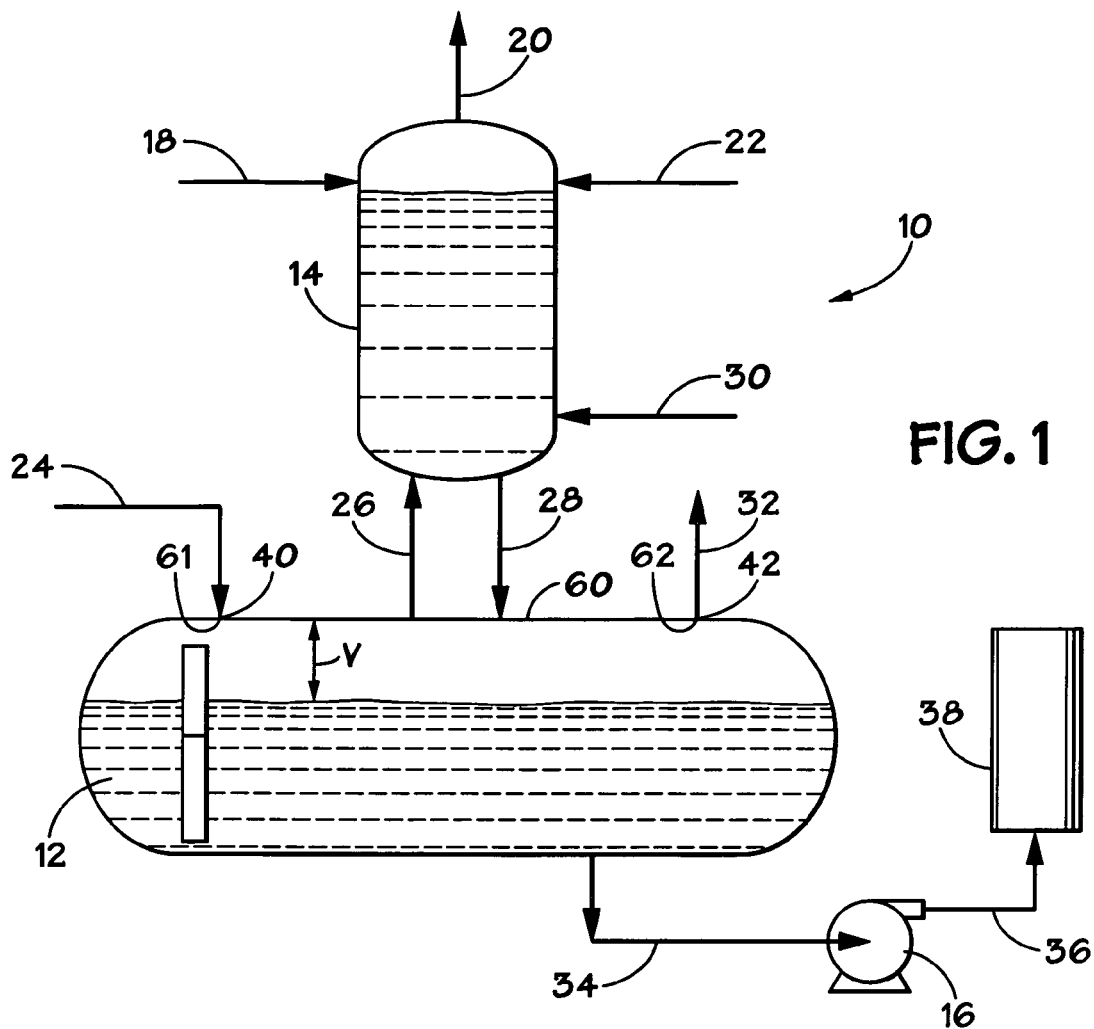
FIG. 1 is a partial cross-sectional plan view of a deaerator having a deaerator stripper and the deaerator utilizing a nitrogen sweep stream during deaerator operations in accordance with an embodiment of the present invention.

With reference to FIG. 1, a method of removing oxygen from a boiler feed water stream 36 is advantageously provided. In a preferred embodiment of the present invention, the method includes the step of supplying a water supply stream 18 to a deaerator stripper 14. Water supply stream 18 preferably is selected from the group consisting of a demineralized water supply stream 18, a condensate return, or recycle, stream 22, an external stream, and combinations thereof. Various types of deaerator strippers can be used in the present invention. Water supply stream 18 can be supplied to deaerator stripper 14 which may be an atomizer tower, a tray tower, or a packed tower. Other suitable types of deaerator strippers will be apparent to those of skill in the art and are to be considered within the scope of the present invention.

In order to produce 1500 psig steam, a high purity water supply, such as demineralized water, is required for water supply stream 18. To produce a high purity water supply stream 18, a raw water supply stream can be treated through a demineralizer resin bed to remove cations and anions to give conductivities below 5 micromoles. Because the storage tank is under atmospheric pressure, at this point, water supply stream 18 is still saturated with dissolved gas amounts of oxygen, nitrogen, and carbon dioxide. Besides the demineralized water supply stream 18, condensate return, or recycle, stream 22 can also be sent to deaerator stripper 14.

The two water sources, demineralized water supply stream 18 and condensate return stream 22 (collectively referred to hereafter as "water supply stream 18"), enter deaerator stripper 14 preferably in a top section of deaerator stripper 14. Deaerator stripper 14 is typically located on top of a deaerator water tank 12, which is also referred to as a boiler feed water storage tank.

Once inside deaerator stripper 14, at least a portion of oxygen and carbon dioxide contained within water supply stream 18 is removed by countercurrent contact with steam rising through deaerator stripper 14 to produce a reduced oxygen containing water stream 28. Low-pressure steam stream 30 is preferably sent to deaerator stripper 14 at a bottom section of deaerator stripper 14. Countercurrent contact between water supply stream 18 and steam occurs in a mass transfer mechanism, such as trays or packing. At least a portion of low-pressure steam stream 30 exits from a top of deaerator stripper 14 as deaerator stripper overhead stream 20 to remove the dissolved gases from water supply stream 18. Deaerator stripper overhead stream 20 flowrate is about 0.5% to about 1.0% of low-pressure steam stream 30 flowrate. Because solubility is lowered as the water temperature of water supply stream 18 is elevated, the amount of dissolved gases that are removed by deaerator stripper 14 varies depending upon the degree of temperature elevation of water supply stream 18. Deaerator stripper 14 preferably operates in a range of about 20 to about 45 psig.

In addition to removing oxygen and carbon dioxide from water supply stream 18, the countercurrent contact between water supply stream 18 and steam heats water supply stream 18 to a range of about 250° F. to about 295° F., and more preferably in a range of about 260° F. to about 290° F. Reduced oxygen containing water stream 28 descends down deaerator stripper 14 to a deaerator water tank 12.

Once reduced oxygen containing water stream 28 is in deaerator water tank 12, a nitrogen sweep stream 24 is supplied to deaerator water tank 12 during deaerator operations. Nitrogen sweep stream 24 diffuses remaining oxygen in reduced oxygen containing water stream 28 resulting in a substantial portion of the remaining oxygen being removed from reduced oxygen containing water stream 28. Nitrogen sweep stream 24 also diffuses remaining carbon dioxide in reduced oxygen containing water stream 28 resulting in a substantial portion of the remaining carbon dioxide being removed from reduced oxygen containing water stream 28. Nitrogen sweep stream 24 may be supplied intermittently, substantially continuously, or continuously; however, substantially continuous, or continuous, operation is preferred.

Deaerator water tank 12 preferably operates in a range of about 1 psig to about 3 psig lower pressure than deaerator stripper 14 so that the water is at saturation conditions at about 17 psig to about 44 psig pressure, which corresponds to about 250° F. to about 295° F. in steam tables.

Reduced oxygen containing water stream 28 is then supplied to a boiler 38 as a feed water stream 36 having substantially reduced oxygen contained therein. Deaerator tank bottom stream 34 can be pumped using a boiler feed water pump 16, if needed. In preferred embodiments of the present invention, the step of supplying reduced oxygen containing water stream 28 to boiler 38 includes supplying reduced oxygen containing water stream 28 preferably having an oxygen concentration of less than about 7 parts per billion (ppb). Further, in preferred embodiments, the step of supplying reduced oxygen containing water stream 28 to boiler 38 more preferably includes supplying reduced oxygen containing water stream 28 having essentially no oxygen contained therein.

A water level within deaerator water tank 12 is typically maintained in a range of about 40% to about 70% to ensure a proper vapor space V for supplying nitrogen sweep stream 24 to deaerator water tank 12. Vapor space V is located above reduced oxygen containing water stream 28 contained within deaerator water tank 12.

A low-pressure steam stream 30 can be supplied to deaerator stripper 14 to assist in the step of removing at least a portion of oxygen and carbon dioxide contained within water supply stream 18. Low-pressure steam stream 30 advantageously provides at least a portion of stripping vapors needed to remove the at least a portion of oxygen and carbon dioxide contained within water supply stream 18. Vapors from reduced oxygen containing water stream 28 can also be sent as steam return stream 26 to provide an alternative or additional source of stripping vapors within deaerator stripper 14.

Figure 2:
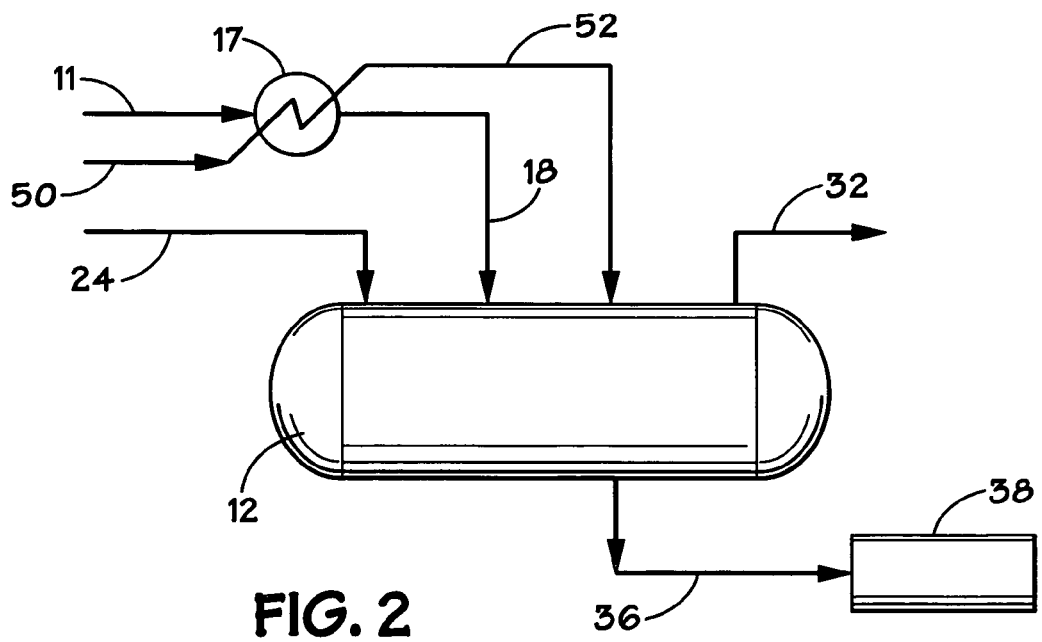
FIG. 2 is a partial cross-sectional plan view of a deaerator using a heat exchanger to supply heated water to the deaerator and the deaerator utilizing a nitrogen sweep stream during deaerator operations in accordance with an embodiment of the present invention.

As an alternative to the use of a deaerator stripper 14, as shown in FIG. 2, the present invention also advantageously provides an embodiment that includes the step of heating a water supply stream 11 to produce a heated water supply stream 18. The step of heating the water supply stream 18 can be accomplished using a heat exchanger 17. Other suitable types of equipment that are capable of heating water supply stream 11 will be apparent to those of skill in the art and are to be considered within the scope of the present invention. A low pressure steam stream 50 can be used to provide sufficient heat necessary to heat water supply 11. A return low pressure steam stream 52 can then be returned to deaerator water tank 12. Heated water supply stream 18 is then supplied to deaerator water tank 12. The nitrogen sweep stream 24 is then supplied to deaerator water tank, as in the previously described embodiment, to remove oxygen and carbon dioxide from water supply stream 18 to produce boiler feed water stream 36 having substantially reduced amounts of oxygen and carbon dioxide contained therein.

As yet another method embodiment, a heated water supply stream 18 can be supplied to deaerator water tank 12. In this embodiment, as in the others, a nitrogen sweep stream 24 is supplied to deaerator water tank 12 to remove a substantial portion of oxygen contained within heater water supply stream 18 to produce boiler feed water stream 36 that contains substantially reduced amounts of oxygen therein.

In addition to the method embodiments described herein, the present invention also advantageously includes a deaerator apparatus 10 for removing oxygen from boiler feed water 36. In this embodiment, deaerator apparatus 10 preferably includes deaerator stripper 14 and deaerator water tank 12.

Deaerator stripper 14 mechanically removes at least a portion of oxygen and at least a portion of carbon dioxide from a water supply stream 18 supplied to deaerator stripper 14. Deaerator stripper 14 produces reduced oxygen containing water stream 28 that descends down deaerator stripper 14 to deaerator water tank 12. As indicated herein, deaerator stripper 14 is preferably an atomizer tower, a tray tower, or a packed tower, or similar apparatus.

Deaerator water tank 12 is primarily used for storing reduced oxygen containing water stream 28. Deaerator water tank 12 advantageously includes a nitrogen, or nitrogen gas, supply connection 40 and may include a nitrogen return connection 42 for removing nitrogen sweep stream 24 and removing oxygen containing nitrogen sweep stream 32 respectively. Nitrogen supply connection 40 may preferably be an opening, preferably a small opening, provided in an upper wall surface 60 of tank 12, and may include a valve 61. Similarly, nitrogen return connection 42 may preferably be an opening, preferably a small opening, provided in an upper wall surface 60 of tank 12, and may also include a valve 62. Nitrogen sweep stream 24 is advantageously utilized during deaerator operations to diffuse remaining oxygen in reduced oxygen containing water stream 28 contained within deaerator water tank 12. As a result of using nitrogen sweep stream 24, a substantial portion of the remaining oxygen is removed from reduced oxygen containing water stream 28 resulting in boiler feed water stream 36 being essentially free of oxygen and carbon dioxide. Nitrogen supply connection 40 and nitrogen return connection 42 are located within a vapor space V located above reduced oxygen containing water stream 28 contained within deaerator water tank 12. Alternatively, steam return stream 26 may be utilized, in lieu of nitrogen return connection 42, to remove nitrogen sweep stream 24 and to remove oxygen containing nitrogen sweep stream 32.

EXAMPLE 1

An ethylene production plant experienced a plant upset when its instrument air system failed. The ethylene plant utilized a deaerator to remove oxygen and carbon dioxide from its boiler feed water stream. In addition to the failure of the instrument air system, the incoming steam stream flow at the bottom of the deaerator stripper damaged the trays in the lower section of the deaerator stripper. Because the deaerator stripper trays had been damaged, the boiler feed water had an oxygen concentration well above the desired target of 7 ppb. Oxygen levels were detected as high as in the range of about 300 ppb to about 500 ppb as a result of the damaged trays preventing normal steam-water contact in its operation. Because repairing the trays would result in a costly, lengthy downtime, or offline, period, the plant operator decided to wait to repair the deaerator stripper trays. With such high levels of oxygen in the boiler feed water stream, corrosion was a serious concern if corrective action was not taken.

It is known that having an oxygen concentration in boiler feed water of more than 7 ppb causes significant corrosion within a steam system. A goal of the present invention is to reduce the amount of oxygen in boiler feed water stream 36 to less than about 7 ppb and to also reduce carbon dioxide in boiler feed water stream 36 to a non-detectable level. If either of these gases is elevated, then the steam system experiences serious corrosion.

In order to reduce the amount of corrosion experienced in the steam system, higher oxygen scavenger chemical levels had been used to protect the boiler and boiler heat exchange tubes contained therein. Even with the additional oxygen scavenger chemicals, corrosion had been experienced at two surface condenser units contained within the steam system.

Gas samples were taken in the vapor space of the deaerator water tank. The water vapor within the gas samples was condensed and the remaining gases were analyzed with a gas chromatograph. It was thought that the oxygen and nitrogen concentrations would track the 1:4 ratio, however, the oxygen:nitrogen ratio level was closer to 1:2.5. The deaerator water tank was a horizontal vessel, such as 12 in FIG. 1, that was operated in the typical water level range of about 40% to about 70%. While the plant and deaerator were operating at one end of the tank, an opening was made in the upper wall surface 60 of water tank 12, and a small valve 61 was inserted into the opening. A slight nitrogen purge stream was added through the valve 61 (FIG. 1). At the opposite end of the tank 12, another valve 62 was provided and was opened to allow for a nitrogen sweep of the vapor space, while the deaerator was still operating. After the sweep was left on, then the boiler feed water liquid phase was checked for dissolved oxygen with the standard CHEMetrics brand colorimetric test. In the colorimetric test, the glass ampoules contain a dilute solution of diethylene glycol that turns to shades of pink when exposed to water with dissolved oxygen. Before the use of the nitrogen purge stream, the plant was using the 0-1000 ppb color chart. After sweeping the vapor space with nitrogen, the dissolved oxygen content of the boiler feed water dropped to well below 5 ppb.

Besides the lower oxygen level in the boiler feed water stream, several other advantages were observed as a result of utilizing the nitrogen sweep stream during deaerator operations. As discussed herein, to reduce the amount of oxygen in the boiler feed water, the plant had operated with elevated levels of oxygen scavengers to compensate for the higher oxygen levels in the boiler feed water. The increased use of oxygen scavengers had prevented corrosion in most areas of the plant. Two surface condenser units that operated under a vacuum at a temperature range of about 120° F. to about 140° F. had experienced corrosion of the admiralty tubes that resulted in cooling water leaking into the steam condensate system. The leakage was verified by weekly surface condenser samples that detected silica, water hardness, and copper contamination. The corrosion at the surface condenser quickly showed a reduction of copper corrosion to levels that had not been seen in two years. The weekly samples taken immediately after utilization of the nitrogen sweep showed significantly less copper corrosion compared with samples taken prior to use of the nitrogen sweep.

Other advantages were also determined throughout the plant. Prior to the use of the nitrogen sweep, a neutralizing amine was required to control the pH of the condensate return or recycled steam. After use of the nitrogen sweep, the amine requirement was reduced by at least 40%.

In addition to the reduction in the amount of amine required for condensate return pH control, the requirement for oxygen scavenger chemicals was reduced by 80% because the oxygen level dropped from 300-500 ppb to below 5 ppb. Lastly, the repair of the existing deaerator and the plan to add an additional deaerator was delayed until the next scheduled plant outage. A major advantage of the present invention is that an existing, operating plant including a deaerator, may be modified to provide the nitrogen sweep while the plant and deaerator are in operation, whereby a costly and time-consuming plant shutdown is avoided. Such shutdowns can cost millions of dollars in profits on lost production from the plant.

As an advantage of the present invention, operating the deaerator with the nitrogen sweep stream will significantly decrease the downtime that is typically associated with maintaining a steam system. With the reduced oxygen and carbon dioxide levels, it is believed that corrosion will be significantly decreased in the steam system.

As another advantage of the present invention, the design of the deaerator system can be substantially simplified. Because the stripping mechanism will no longer be required, it is possible to have a deaerator system that is free of moving parts, which will substantially decrease the frequency of maintenance that will be required to maintain the deaerator system. Additionally, the omission of moving parts will also reduce the capital costs typically associated with installing a deaerator having a stripper section.

Another advantage of the present invention is believed to be that use of the present invention may increase the rate of demineralized water through demineralized water supply stream 18 through the deaerator stripper 14. For example, the trays and spray nozzles conventionally found in deaerator stripper 14 are typically designed for a maximum steam/water ratio so that the deaerator stripper 14 can reduce the oxygen concentration down to a desired oxygen concentration, such as less than about 7 ppb, for a maximum demineralized water throughput rate through the deaerator stripper 14. If the demineralized water throughput rate exceeds the maximum design rate, the oxygen concentration will climb and may lead to corrosion problems. Many plants, such as petrochemical plants, tend to increase throughput rates over time using the same equipment. Thus, the deaerator stripper 14 would likely require a shutdown and modification for desired higher rates to be used later in the life of the equipment. Use of the present invention is believed to permit future increased demineralized water throughput rates above the design limits of the deaerator stripper 14, by utilizing the nitrogen sweep of the present invention to obtain a lower oxygen concentration, such as below 7 ppb. This technique can be used to debottleneck the deaerator stripper 14.

It is to be understood that the invention is not limited to the exact details of construction, operation, exact materials or embodiments as shown and described, as obvious modifications and equivalents will be apparent to one skilled in the art. For example, the internal stripping mechanism within the deaerator could be trays, packing, or a spray mechanism. Further, the nitrogen sweep supply and return connections to the water tank may be provided in any manner. Accordingly, the invention is therefore to be limited only by the scope of the appended claims.

We claim:

1. A method of removing oxygen from a boiler feed water stream in an operating petrochemical facility having a deaerator, comprising the steps of:
   (a) while the facility is operating, forming a first opening in a wall surface of the deaerator;
   (b) while the facility is operating, providing a nitrogen supply connection in a gas transmitting relationship with the first opening; and
   (c) supplying a nitrogen sweep to the deaerator to remove oxygen from the boiler feed water stream.

2. The method of claim 1, including the step:
   (a) while the facility is operating, forming a second opening in a wall surface of the deaerator; and
   (b) while the facility is operating, providing a nitrogen return connection in a gas transmitting relationship with the second opening.

3. The method of claim 1, further including a step of supplying the boiler feed water stream to a boiler, wherein the boiler feed water stream has an oxygen concentration of less than about 7 ppb.

4. The method of claim 3, wherein the boiler feed water stream has essentially no oxygen contained therein.

5. The method of claim 1, further including a step of maintaining a water level within the deaerator in a range of about 40% to about 70%.

6. The method of claim 1, wherein the first opening is formed at a location in the wall surface of the deaerator above the boiler feed water stream.

7. The method of claim 1, further including heating the boiler feed water stream before supplying it to the deaerator.

8. The method of claim 1, wherein the boiler feed water stream includes water selected from the group consisting of a demineralized water supply stream, a condensate return stream, an external stream, and combinations thereof.

9. The method of claim 2, further including a step of supplying the boiler feed water stream to a boiler, wherein the boiler feed water stream has an oxygen concentration of less than about 7 ppb.

10. The method of claim 9, wherein the boiler feed water stream has essentially no oxygen contained therein.

11. The method of claim 2, further including a step of maintaining a water level within the deaerator in a range of about 40% to about 70%.

12. The method of claim 2, wherein the first opening is formed at a location in the wall surface of the deaerator above the boiler feed water stream.

13. The method of claim 2, further including heating the boiler feed water stream before supplying it to the deaerator.

14. The method of claim 2, wherein the boiler feed water stream includes water selected from the group consisting of a demineralized water supply stream, a condensate return stream, an external stream, and combinations thereof.

* * * * *